(12) United States Patent
Cohen et al.

(10) Patent No.: US 9,409,124 B2
(45) Date of Patent: Aug. 9, 2016

(54) FLOW CONTROL GRID

(75) Inventors: Mitchell B. Cohen, West Hartford, CT (US); Paul J. Chapman, Windsor, CT (US); Paul R. Thibeault, Windsor, CT (US)

(73) Assignee: ALSTOM TECHNOLOGY LTD, Baden (CH)

( * ) Notice: Subject to any disclaimer, the term of this patent is extended or adjusted under 35 U.S.C. 154(b) by 392 days.

(21) Appl. No.: 13/477,158

(22) Filed: May 22, 2012

(65) Prior Publication Data

US 2013/0312858 A1   Nov. 28, 2013

(51) Int. Cl.
| | | |
|---|---|---|
| *F15D 1/04* | (2006.01) | |
| *B01D 53/86* | (2006.01) | |
| *F01N 3/28* | (2006.01) | |
| *F15B 13/04* | (2006.01) | |
| *F15B 13/043* | (2006.01) | |
| *F01N 13/00* | (2010.01) | |

(52) U.S. Cl.
CPC ........... *B01D 53/8631* (2013.01); *F01N 3/2892* (2013.01); *F01N 13/0093* (2014.06); *F01N 13/0097* (2014.06); *F01N 2590/10* (2013.01); *F15B 13/0402* (2013.01); *F15B 13/0436* (2013.01); *F15B 2013/0409* (2013.01); *F15B 2211/30525* (2013.01); *F15B 2211/329* (2013.01); *F15B 2211/634* (2013.01)

(58) Field of Classification Search
CPC   F01N 3/2892;  B01D 46/002;  B01D 46/0045; B01D 2258/0283;  F15D 1/04
USPC ...................................... 138/37, 39; 422/176
See application file for complete search history.

(56) References Cited

U.S. PATENT DOCUMENTS

| | | | | | |
|---|---|---|---|---|---|
| 1,996,596 | A | * | 4/1935 | Smith, Jr. ......................... | 138/39 |
| 2,216,046 | A | * | 9/1940 | Peck ................................. | 138/39 |
| 2,273,818 | A | * | 2/1942 | Childers et al. ................ | 454/335 |
| 2,662,553 | A | * | 12/1953 | Dimmock ........................ | 138/37 |
| 2,813,708 | A | * | 11/1957 | Frey ................................ | 165/9.3 |
| 3,011,584 | A | * | 12/1961 | Lemmerman et al. ......... | 181/217 |
| 3,105,520 | A | * | 10/1963 | Lorett et al. .................... | 138/39 |
| 3,378,994 | A | * | 4/1968 | Farr ................................ | 55/324 |

(Continued)

FOREIGN PATENT DOCUMENTS

| | | |
|---|---|---|
| CN | 1243567 A | 2/2000 |
| CN | 100371054 C | 2/2008 |

(Continued)

OTHER PUBLICATIONS

Website: Fuel Tech GSG—Graduated Straightening Grid: as available at http://www.ftek.com/en-US/products/apc/gsg/, as retrieved on Aug. 22, 2012.

(Continued)

*Primary Examiner* — Patrick M Buechner
*Assistant Examiner* — Randall Gruby
(74) *Attorney, Agent, or Firm* — GE Global Patent Operation; Stephen G. Midgley (57) ABSTRACT

A flow control grid includes a plurality of channel assemblies connected to one another. Each of the plurality of channel assemblies defines a flow straightening section and a flow turning section. The flow turning section has an arcuate segment and a first substantially flat segment. The first substantially flat segment is positioned in the flow straightening section. The arcuate segment extends outwardly from the flow straightening section.

13 Claims, 6 Drawing Sheets

(56) References Cited

U.S. PATENT DOCUMENTS

| | | | | |
|---|---|---|---|---|
| 3,425,189 A * | 2/1969 | Haselmayer | ..................... | 96/64 |
| 3,525,418 A * | 8/1970 | Smith et al. | ................... | 181/218 |
| 3,597,166 A * | 8/1971 | Hochman | ....................... | 22/220 |
| 3,739,872 A * | 6/1973 | McNair | ..................... | 181/218 |
| 3,749,130 A * | 7/1973 | Howitt et al. | ..................... | 138/42 |
| 3,880,597 A * | 4/1975 | Goldschmidt et al. | ........ | 422/176 |
| 3,926,595 A * | 12/1975 | Bockman | ....................... | 55/302 |
| 4,041,591 A * | 8/1977 | Noll et al. | ................. | 29/890.034 |
| 4,213,766 A * | 7/1980 | Wyatt | ................................ | 95/78 |
| 4,360,432 A * | 11/1982 | Kieronski | ..................... | 210/402 |
| 4,471,821 A * | 9/1984 | Coulon et al. | ................ | 141/286 |
| 4,880,378 A * | 11/1989 | Hums | ........................... | 431/170 |
| 4,883,509 A * | 11/1989 | Giusti et al. | ..................... | 55/326 |
| 4,883,510 A * | 11/1989 | Giusti et al. | ..................... | 55/326 |
| 4,911,205 A * | 3/1990 | Myers | ............................. | 138/39 |
| 4,919,170 A | 4/1990 | Kallinich et al. | | |
| 5,025,659 A * | 6/1991 | Starr et al. | ..................... | 73/147 |
| 5,030,261 A * | 7/1991 | Giusti et al. | ..................... | 55/326 |
| 5,043,146 A | 8/1991 | Ishikawa et al. | | |
| 5,405,106 A * | 4/1995 | Chintamani | ............ | G01M 9/04 |
| | | | | 138/39 |
| 5,431,009 A * | 7/1995 | Bauver, II | ................. | 60/39.182 |
| 5,435,175 A * | 7/1995 | Kramer et al. | ................. | 73/147 |
| 5,449,499 A * | 9/1995 | Bauer et al. | ................... | 422/176 |
| 5,531,484 A * | 7/1996 | Kawano | ..................... | 285/179.2 |
| 5,603,909 A * | 2/1997 | Varner | ................. | B01D 53/504 |
| | | | | 422/173 |
| 5,861,585 A * | 1/1999 | Van Every | ............. | G01M 9/04 |
| | | | | 181/224 |
| 5,902,364 A * | 5/1999 | Tokar | ................... | B01D 25/001 |
| | | | | 55/498 |
| 5,946,901 A * | 9/1999 | Bauver | ................. | F22B 1/1815 |
| | | | | 122/7 R |
| 6,004,095 A * | 12/1999 | Waitz | .................... | B64C 21/025 |
| | | | | 415/115 |
| 6,290,266 B1 * | 9/2001 | Kawano | ..................... | 285/125.1 |
| 6,644,355 B1 * | 11/2003 | Gleason | .......................... | 138/37 |
| 6,725,912 B1 * | 4/2004 | Moll | ......................... | G01M 9/02 |
| | | | | 165/140 |
| 6,802,690 B2 * | 10/2004 | Han | ........................ | F01D 25/30 |
| | | | | 138/37 |
| 6,905,658 B2 * | 6/2005 | Rogers et al. | ................. | 422/172 |
| 6,923,051 B2 * | 8/2005 | Fleming | ........................... | 73/147 |
| 7,024,929 B2 * | 4/2006 | Fleming et al. | ................. | 73/147 |
| 7,063,817 B2 * | 6/2006 | Sigling | ............. | B01D 53/8631 |
| | | | | 422/171 |
| 7,097,814 B2 * | 8/2006 | Shishido et al. | ............. | 422/176 |
| 7,303,730 B2 * | 12/2007 | Shishido et al. | ............. | 422/177 |
| 7,438,876 B2 * | 10/2008 | Cichanowicz | ..... | B01D 53/8631 |
| | | | | 422/168 |
| 7,531,143 B2 * | 5/2009 | Bruggendick et al. | ........ | 422/176 |
| 7,600,605 B2 * | 10/2009 | Roark | ....................... | B64F 1/26 |
| | | | | 181/203 |
| 7,641,865 B2 * | 1/2010 | Tonkovich | ........... | B01J 19/0093 |
| | | | | 422/129 |
| 7,862,787 B1 * | 1/2011 | Skelley et al. | ................. | 423/210 |
| 7,957,133 B2 * | 6/2011 | Zieman et al. | ............ | 361/679.51 |
| 8,141,588 B2 * | 3/2012 | Tan | .................... | B01D 53/8631 |
| | | | | 138/37 |
| 8,251,406 B2 * | 8/2012 | Kawano | ........................ | 285/179 |
| 8,303,900 B2 * | 11/2012 | Hayashi | ................ | F01N 3/2066 |
| | | | | 422/176 |
| 8,999,276 B1 * | 4/2015 | Bui | ....................... | F01N 3/2066 |
| | | | | 423/212 |
| 2002/0081241 A1 | 6/2002 | Sigling | | |
| 2003/0003029 A1 | 1/2003 | Rogers et al. | | |
| 2003/0070479 A1 * | 4/2003 | Lacey, Jr. | ................ | G01M 9/02 |
| | | | | 73/147 |
| 2004/0089065 A1 * | 5/2004 | Lacey, Jr. | ........................ | 73/147 |
| 2007/0234713 A1 * | 10/2007 | Blaisdell et al. | ................. | 60/299 |
| 2008/0022907 A1 * | 1/2008 | Varner | ....................... | F23J 3/00 |
| | | | | 110/165 A |
| 2008/0190592 A1 * | 8/2008 | Bruck et al. | ................... | 165/159 |
| 2008/0289714 A1 | 11/2008 | Tan et al. | | |
| 2010/0015267 A1 * | 1/2010 | Keller et al. | .................. | 425/113 |
| 2010/0154911 A1 * | 6/2010 | Yoskowitz | ....................... | 138/39 |
| 2011/0120512 A1 * | 5/2011 | Delle | ................... | A47L 15/4291 |
| | | | | 134/115 R |
| 2012/0125467 A1 * | 5/2012 | Chiu | ............................. | 138/103 |
| 2013/0192810 A1 * | 8/2013 | Lech | ........................ | F28F 1/00 |
| | | | | 165/175 |
| 2013/0224081 A1 * | 8/2013 | Helmberg et al. | ............. | 422/176 |
| 2013/0306556 A1 * | 11/2013 | Brogaard | .............. | B01D 53/507 |
| | | | | 210/632 |
| 2013/0312858 A1 * | 11/2013 | Cohen | ................ | B01D 53/8631 |
| | | | | 138/39 |
| 2014/0120002 A1 * | 5/2014 | Nilsson | ................ | B01D 53/565 |
| | | | | 422/169 |
| 2014/0208994 A1 * | 7/2014 | Cohen | ...................... | F23J 15/02 |
| | | | | 110/205 |
| 2014/0332081 A1 * | 11/2014 | Fitzgerald | ............ | B01J 19/0093 |
| | | | | 137/1 |
| 2015/0322859 A1 * | 11/2015 | Van Den Bossche | ............... | B01D 46/002 |
| | | | | 60/39.092 |

FOREIGN PATENT DOCUMENTS

| | | |
|---|---|---|
| CN | 101940878 A | 1/2011 |
| CN | 102213253 A | 10/2011 |
| DE | 971995 | 5/1959 |
| DE | 8619685 | 9/1986 |
| DE | 44 35 103 | 4/1996 |
| GB | 346748 | 4/1931 |
| GB | 598928 A | 3/1948 |
| JP | 56-21631 | 2/1981 |
| JP | 60/196414 A | 10/1985 |
| JP | S61-149039 U | 9/1986 |
| JP | 01-127029 | 5/1989 |
| JP | H05-64510 U | 8/1993 |
| JP | 2001-280311 A | 10/2001 |
| JP | 2003-503172 | 10/2003 |
| JP | 2004-255324 | 9/2004 |
| KR | 10 0679788 B1 | 2/2007 |
| WO | 01/00303 A1 | 1/2001 |
| WO | 2009/082665 | 7/2009 |
| WO | 2009/095008 A2 | 8/2009 |

OTHER PUBLICATIONS

Final Notice of Preliminary Rejection from the Korean Patent Office dated Nov. 2, 2014 for KR Appln. No. 10-2013-0056984.

ROC (Taiwan) Office Action for Appln. No. 102117934 dated Jan. 6, 2015.

ROC (Taiwan) Office Action for Appln. No. 102117934 dated Jun. 5, 2015.

Notice of allowance issued from Japanese Patent Office dated Feb. 15, 2016 for JP Application No. 2013-107872.

* cited by examiner

FLOW CONTROL GRID

FIELD

The disclosed subject matter relates to a flow control grid and more specifically to a flow control grid including a flow straightening section having a plurality of flow channel assemblies and a flow turning section having a plurality of turning vanes which extend into and cooperate with the flow straightening section to cause a change in direction of fluid flow and to develop a uniform flow velocity profile across an outlet of the flow control grid.

BACKGROUND

Most of the energy used in the world is derived from the combustion of carbon and hydrogen-containing fuels such as coal, oil and natural gas. In addition to carbon and hydrogen, these fuels contain oxygen, moisture and contaminants. Flue gas is a byproduct of the combustion of the fuels and can contain ash, sulfur (often in the form of sulfur oxides, referred to as "SOx"), nitrogen compounds (often in the form of nitrogen oxides, referred to as "NOx"), chlorine, mercury, and other trace elements. Awareness regarding the damaging effects of the contaminants released during combustion triggers the enforcement of ever more stringent limits on emissions from power plants, refineries and other industrial processes. There is an increased pressure on operators of such plants to achieve near zero emission of contaminants.

Numerous processes and systems have been developed in response to the desire to achieve near zero emission of contaminants Systems and processes include, but are not limited to selective catalytic reduction (SCR) systems, desulfurization systems (known as wet flue gas desulfurization "WFGD" and dry flue gas desulfurization "DFGD"), particulate filters (including, for example, bag houses, particulate collectors, and the like), as well as the use of one or more sorbents that absorb contaminants from the flue gas.

Chemical reactions on a solid catalyst surface of commercial SCR systems convert NOx to $N_2$. Typically the solid catalysts are disposed on a substrate formed in a grid configured to allow the flue gas to flow through the grid and react with the catalyst. One problem with SCR system is that activity of the catalyst depends on temperature and flue gas constituents and deteriorates over time. For example, catalysts may require replacement prematurely due to erosion caused by localized high velocities of the flue gas through portions of the grid. However, controlling the velocity of the flue gas entering the grid can be difficult because typically flue gas enters the SCR generally horizontally from a side and must turn and change to a downward direction at an inlet of the grid. Apparatuses for changing the direction of the flue gas and attempting to establish a uniform velocity profile of the flue gas entering the grid are typically large and add significant height to a SCR. Such apparatuses are heavy, difficult to install and the increased SCR height results in increased cost. Accordingly, there is a need for a more compact and effective flow control grid that can change the direction of fluid flow and create a substantially uniform velocity profile at the outlet thereof.

SUMMARY

According to aspects illustrated herein, there is provided a flow control grid including a plurality of channel assemblies connected to one another. Each of the plurality of channel assemblies defines a flow straightening section and a flow turning section. The flow turning section has an arcuate segment and a first substantially flat segment. The first substantially flat segment is positioned in the flow straightening section. The arcuate segment extends outwardly from the flow straightening section.

According to other aspects disclosed herein, there is provided a conduit for controlling fluid velocity including an inlet duct in fluid communication with a hood section. The conduit includes a flow control grid extending across the hood section in a stepped configuration. The conduit also includes a plurality of channel assemblies connected to one another. Each of the plurality of channel assemblies defines a flow straightening section and a flow turning section. The flow turning section has an arcuate segment and a substantially flat segment. The substantially flat segment is positioned in the flow straightening section and the arcuate segment extends outwardly from the flow straightening section.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1:
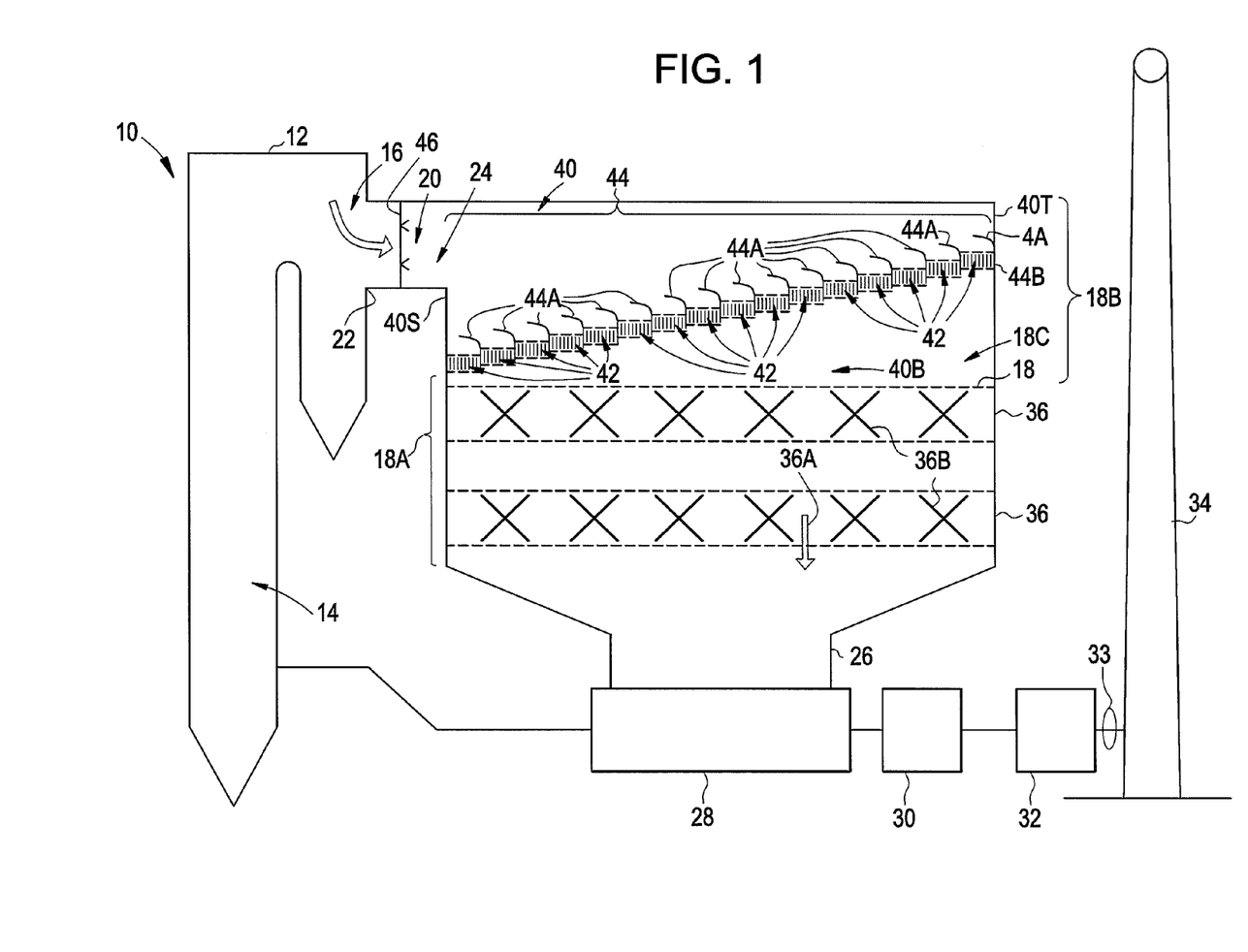
FIG. 1 is a schematic diagram of a power plant system including a Selective Catalytic Reduction (SCR) reactor therein.

Referring now to FIG. 1, a power plant, such as a coal fired power plant, is designated generally by the numeral 10. The power plant 10 includes a furnace 12 defining a combustion chamber 14 and a flue gas exhaust section 16 positioned downstream of the combustion chamber. The flue gas exhaust section 16 is in fluid communication with and coupled to a Selective Catalytic Reduction (SCR) reactor 18 by a conduit 20. The conduit 20 is connected between an outlet 22 of the exhaust section 16 and an inlet 24 of the SCR reactor 18. The SCR reactor 18 defines an outlet 26 that is in fluid communication with an air preheater 28. An electrostatic precipitator 30 is in fluid communication with and positioned downstream of the air preheater 28. A Flue Gas Desulfurization System (FGDS) 32 is in fluid communication with and positioned downstream of the electrostatic precipitator 30. A stack 34 is in fluid communication with and positioned downstream of the FGDS 32 and an induced draft fan 33.

The SCR reactor 18 defines a main body section 18A having a lower downstream end positioned adjacent to and in fluid communication with the outlet 26. The SCR reactor 18 also defines a hood section 18B positioned adjacent to and in fluid communication with the inlet 24. Two catalyst grids 36 are positioned in an interior area 18C defined by the SCR reactor 18. The catalyst grids 36 have a plurality of flow paths 36A extending therethrough. A catalytic material 36B is disposed on surfaces of the catalyst grids 36 so that flue gas flowing, with ammonia injected from another grid 46, through the catalyst grids 36 is exposed to and reacts with the catalytic material, to remove pollutants such as NOx from the flue gas.

The SCR reactor 18 also includes a flow control grid 40 positioned in the hood section 18B downstream of the inlet 24 and upstream of and above the catalyst grids 36. The flow control grid 40 defines a flow straightening section 42 positioned in a lower segment (e.g., downstream) of the flow control grid 40. The flow control grid 40 also includes a flow turning section 44. The flow turning section 44 includes a first segment 44A extending outwardly from and positioned above (e.g., upstream of) the flow straightening section 42 and a second segment 44B positioned in and constituting part of the straightening section 42. The flow control grid 40 is configured to cause a ninety degree change in direction of fluid flow and to develop a uniform flow velocity profile across an outlet 40B of the flow control grid. For example, referring to FIG. 2, the direction of fluid flow is changed from a first direction F1 generally parallel to an axis designated X-axis in the conduit 20 to a second direction F2 below the flow control grid 40. The fluid flows in the general direction of the arrows F3 between the conduit 20 and the outlet 40B. The first direction F1 is oriented ninety degrees from the second direction F2, which generally parallel to an axis designated Z-axis. While the flow control grid 40 is shown and described to affect a ninety degree change in direction of flow, the present disclosure is not limited in this regard as the flow control grid may be configured for changes in flow directions of other magnitudes including but not limited to those having magnitudes greater than or less than ninety degrees.

Figure 2:
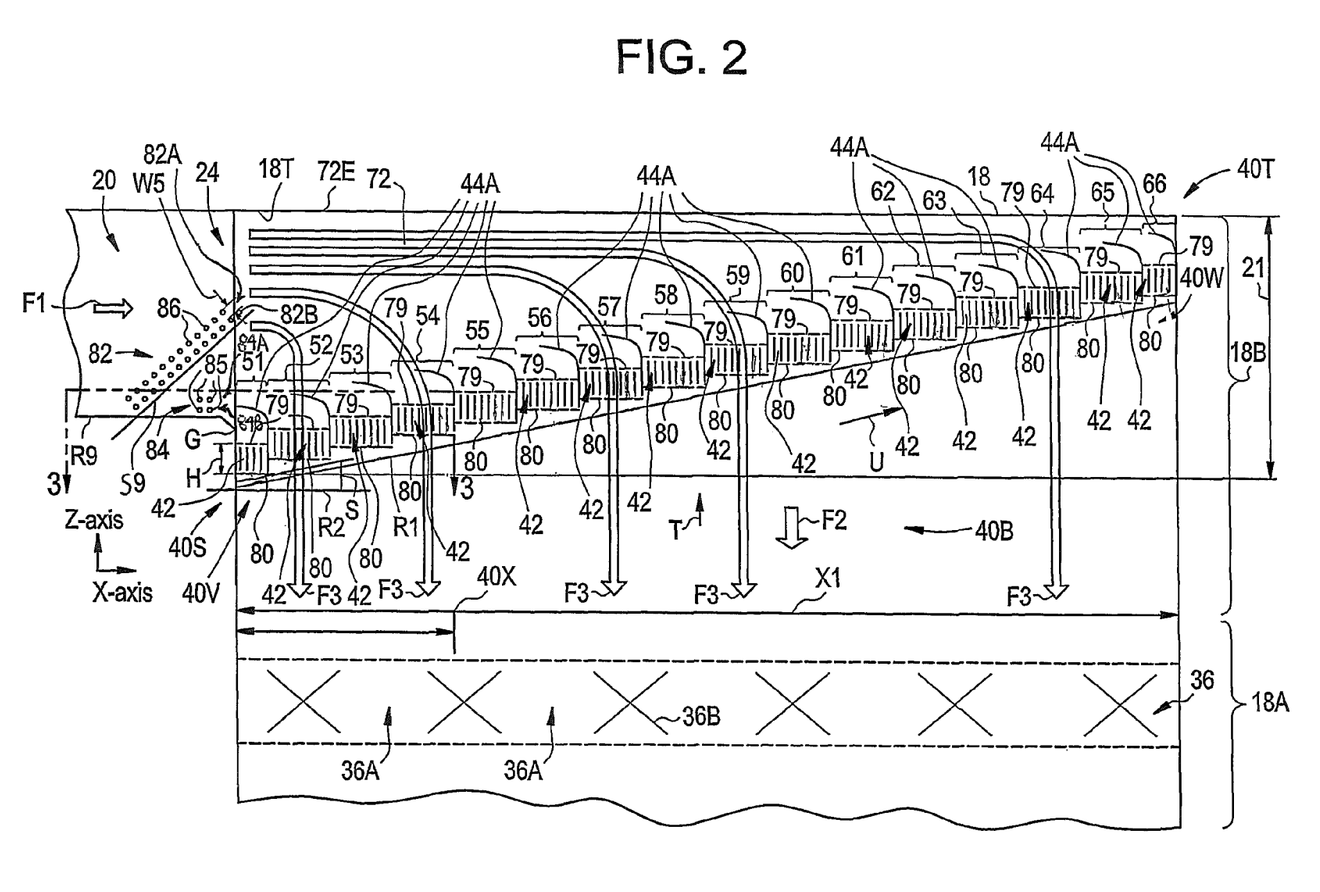
FIG. 2 is a side elevation view of an SCR having flow control grid installed therein.

Referring to FIG. 2, the control grid 40 is shown having sixteen channel assemblies 51, 52, 53, 54, 55, 56, 57, 58, 59, 60, 61, 62, 63, 64, 65 and 66 positioned in the hood section 18B in a stepped configuration having a slope defined by an angle S between a first reference line R1 and a second reference line R2. In one embodiment the angle S is about 8 to about 12 degrees. Each of the channel assemblies 52, 53, 54, 55, 56, 57, 58, 59, 60, 61, 62, 63, 64, 65 and 66 is offset in the direction of the arrow T (e.g., upwardly) from a respective one of the channel assemblies 51, 52, 53, 54, 55, 56, 57, 58, 59, 60, 61, 62, 63, 64 and 65 adjacent to and on the inlet 24 side of the respective one of the channel assemblies 52, 53, 54, 55, 56, 57, 58, 59, 60, 61, 62, 63, 64, 65 and 66. For example, the channel assembly 52 is offset from the channel assembly 51, in the direction indicated by the arrow T, by a distance G. While the control grid 40 is shown and described as having sixteen of the channel assemblies 51, 52, 53, 54, 55, 56, 57, 58, 59, 60, 61, 62, 63, 64, 65 and 66 positioned in the hood section 18B, the present disclosure is not limited in this regard as any number of the channel assemblies may be employed. The angle S may vary depending upon the actual duct dimensions.

Figure 3:
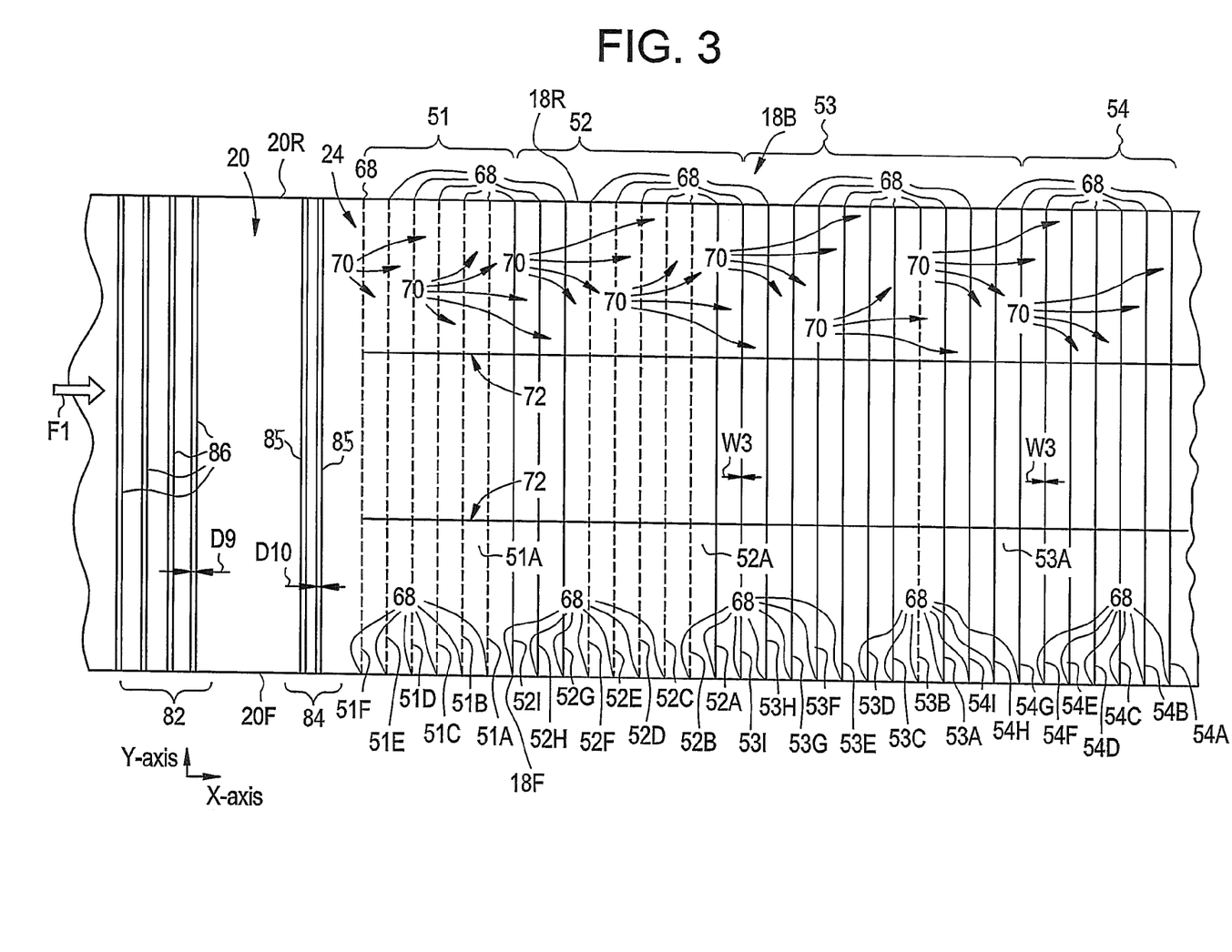
FIG. 3 is a top view of a portion of the flow control grid of FIG. 2, taken across section 3-3 of FIG. 2.

As shown in FIG. 3, the channels assemblies 51, 52, 53 and 54 extend from and are secured to a first side 18F of the SCR reactor 18 and terminate and are secured to a second side 18R of the SCR reactor. Similar to that shown in FIG. 3 for channels assemblies 51, 52, 53 and 54, channel assemblies 55, 56, 57, 58, 59, 60, 61, 62, 63, 64, 65 and 66 also extend from and are secured to a first side 18F of the SCR reactor 18 and terminate and are secured to a second side 18R of the SCR reactor, similar to that described and shown for channel assemblies 51, 52, 53 and 54. As shown in FIG. 2, the channel assemblies 51, 52, 53, 54, 55, 56, 57, 58, 59, 60, 61, 62, 63, 64, 65 and 66 are arranged in the stepped configuration starting from an area 40S adjacent to the inlet 24. End faces 68 of the channel assemblies 51, 52, 53, 54, 55, 56, 57, 58, 59, 60, 61, 62, 63, 64, 65 and 66 are positioned diagonally across the first side 18F and the second side 18R of the hood section 18B in the general direction of the arrow U and terminating adjacent to a corner 40T of the hood section 18B. As illustrated in FIGS. 2 and 3, two plates 72 extend transversely across and support the channel assemblies 51, 52, 53, 54, 55, 56, 57, 58, 59, 60, 61, 62, 63, 64, 65 and 66. One edge 72E of the each of the plates 72 is secured to an inside surface 18T defined by the hood section 18B.

Figure 4:
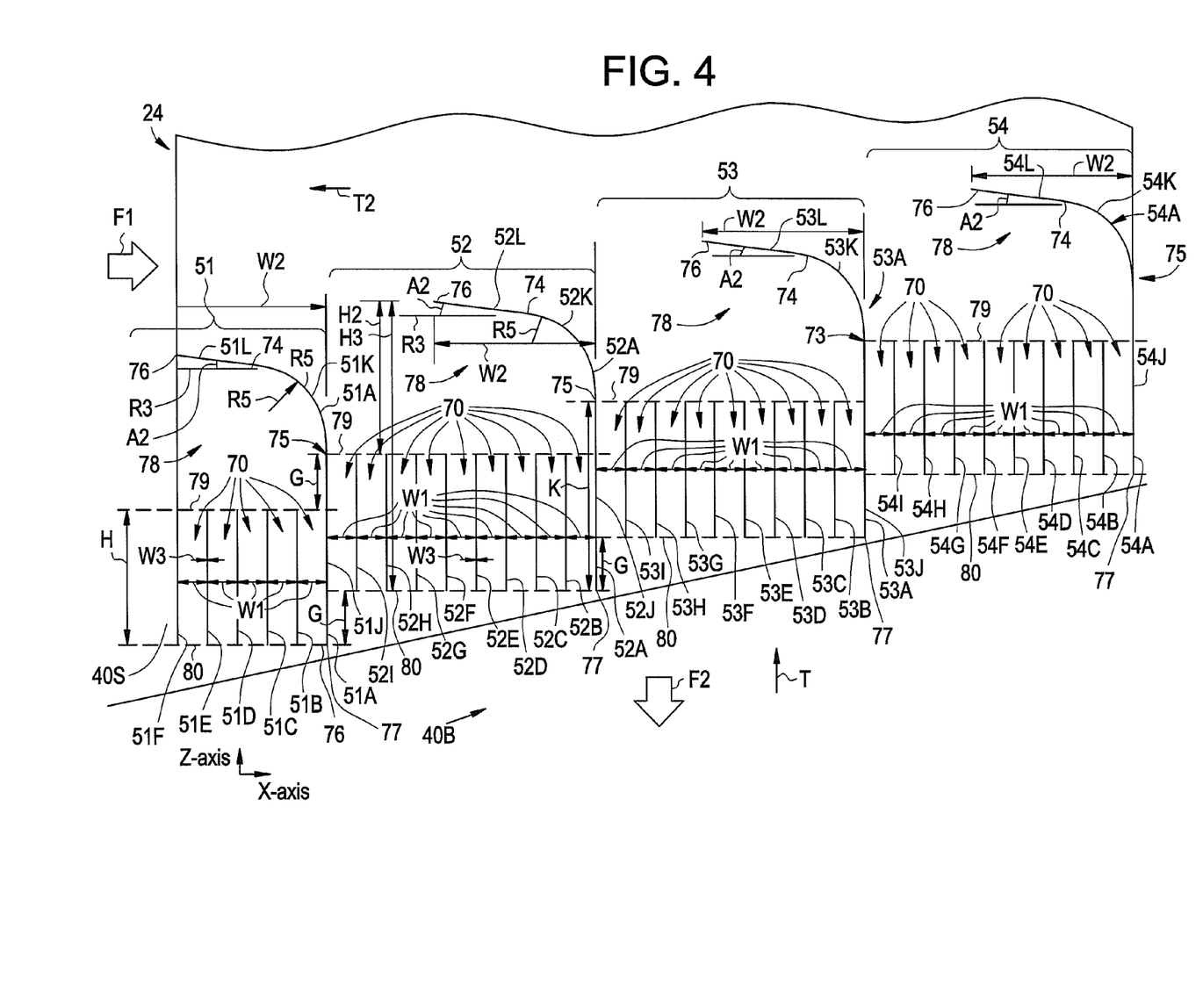
FIG. 4 is an enlarged view of a portion of the flow control grid of FIG. 3.

Referring to FIGS. 2-4, the flow channel assembly 51 adjacent to the inlet 24 includes a turning vane 51A and five flow plates 51B, 51C, 51D, 51E and 51F positioned substantially parallel to one another and spaced apart from one another by a distance W1. Each of the flow plates 51B, 51C, 51D, 51E and 51F is substantially flat and has a height H and a thickness W3. The turning vane 51A is defined by: 1) a first substantially straight section 51J extending between a first point 77 and a second point 75; 2) an arcuate segment 51K extending between the second point 75 and a third point 74 and having a radius of curvature R5; and 3) a second substantially flat section 51L extending from the third point 74 and terminating at a fourth point 76 (i.e., a distal end of the flat section 51L). The second substantially flat section 51L is skewed away from the flow plates 51B, 51C, 51D, 51E and 51F at an angle A2 relative to a reference line R3. The second substantially flat section 51L and the arcuate segment 51K extend over the flow plates 51B, 51C, 51D, 51E and 51F towards the inlet 24 in a direction indicated by a arrow T2, by a distance W2. In one embodiment the distance G is about one third of the height H. In one embodiment, the distance W2 is about equal to five times the distance W1 plus about five times the thickness W3. In one embodiment, the angle A2 is about ten degrees. In one embodiment the distance W1 is about four inches. While the angle A2 is described as being about ten degrees, the present invention is not limited in this regard as the angle A2 may be of other magnitudes including those greater or less than ten degrees. Although the distance W1 is described as being about four inches, the distance W1 may be of other magnitudes greater or less than four inches.

Adjacent pairs of the flow plates 51B, 51C, 51D, 51E and 51F define flow paths 70 therebetween (e.g., flow paths having rectangular cross sections). The first substantially straight section 51J and the flow plate 51B define another flow path 70 therebetween. Each of the flow paths 70 extend between an inlet plane 79 and an outlet plane 80. A turning area 78 is defined between the second substantially flat section 51L and the arcuate segment 51K, and the inlet plane 79. In the turning area 78 fluid flowing in the direction F1 is turned ninety degrees to the direction F2 as shown by the arrows F3.

The fourth point 76 is spaced apart from the inlet plane 79, in the direction indicated by the arrow T by a distance H2 measured along a line perpendicular to the inlet plane. The flow channel assembly 51 has an overall height H3 equal to the sum of the distance H2 and the height H of the flow plates 51B, 51C, 51D, 51E and 51F.

Referring to FIGS. 2-4, the flow channel assembly 52 positioned between the flow channel assemblies 51 and 53 includes a turning vane 52A and eight flow plates 52B, 52C, 52D, 52E, 52F, 52G, 52H and 52I positioned substantially parallel to one another and spaced apart from one another by a distance W1. Each of the flow plates 52B, 52C, 52D, 52E, 52F, 52G, 52H and 52I is substantially flat and has a height H. The turning vane 52A is defined by: 1) a first substantially straight section 52J extending between a first point 77 and a second point 75; 2) an arcuate segment 52K extending between the second point 75 and a third point 74 and having a radius of curvature R5; and 3) a second substantially flat section 52L extending from the third point 74 and terminating at a fourth point 76. The second substantially flat section 52L is skewed away from the flow plates 52B, 52C, 52D, 52E and 52F at an angle A2 relative to a reference line R3. The second substantially flat section 52L and the arcuate segment 52K extend over the flow plates 52B, 52C, 52D, 52E and 52F towards the inlet 24, by a distance W2.

Adjacent pairs of the flow plates 52B, 52C, 52D, 52E, 52F, 52G, 52H and 52I define flow paths 70 therebetween. The first substantially straight section 52J and the flow plate 52B define another flow path 70 therebetween; and first substantially straight section 51J and the flow plate 52I define another flow path 70 therebetween. Each of the flow paths 70 extend between an inlet plane 79 and an outlet plane 80. A turning area 78 is defined between the second substantially flat section 52L and the arcuate segment 52K, and the inlet plane 79. In the turning area 78 fluid flowing in the direction F1 is turned ninety degrees to the direction F2. The fourth point 76 is spaced apart from the inlet plane 79, in the direction indicated by the arrow T by a distance H2 measured along a line perpendicular to the inlet plane. The flow channel assembly 52 has an overall height H3 equal to the sum of the distance H2 and the height H of the flow plates 52B, 52C, 52D, 52E, 52F, 52G, 52H and 52I.

Each of the flow channel assemblies 53, 54, 55, 56, 57, 58, 59, 60, 61, 62, 63, 64 and 65 is configured similarly to the flow channel assembly 52. The flow channel assembly 66 is configured similar to the flow channel assembly 51. Accordingly, like elements are assigned like element numbers and letters. For example, flow channel assembly 53 includes a turning vane 53A and eight flow plates 53B, 53C, 53D, 53E, 53F, 53G, 53H and 53I positioned substantially parallel to one another and spaced apart from one another by a distance W1. Each of the flow plates 53B, 53C, 53D, 53E, 53F, 53G, 53H and 53I is substantially flat and has a height H. The turning vane 53A is defined by: 1) a first substantially straight section 53J extending between a first point 77 and a second point 75; 2) an arcuate segment 53K extending between the second point 75 and a third point 74 and having a radius of curvature R5; and 3) a second substantially flat section 53L extending from the third point 74 and terminating at a fourth point 76. The second substantially flat section 53L is skewed away from the flow plates 53B, 53C, 53D, 53E and 53F at an angle A2 relative to a reference line R3. The second substantially flat section 53L and the arcuate segment 53K extend over the flow plates 53B, 53C, 53D, 53E and 53F towards the inlet 24, by a distance W2. The flow channel assemblies 51, 52, 53, 54, 55, 56, 57, 58, 59, 60, 61, 62, 63, 64, 65 and 66 each have an overall height H3 equal to the sum of the distance H2 and the height H.

Referring to FIGS. 2 and 4 the flow channel assemblies 51, 52, 53, 54, 55, 56, 57, 58, 59, 60, 61, 62, 63, 64, 65 and 66 each define a first aspect ratio equal to the height H divided by the distance W1. In one embodiment, the first aspect ratio is equal to about 3 to about 4.5. While the first aspect ratio is described as being equal to about 3 to about 4.5, the present disclosure is not limited in this regard as the first aspect ratio may be of other magnitudes including but not limited to the following range: 2 to 9.

Substantial computational fluid dynamic analysis was performed by the inventors which identified, contrary to conventional logic, that the channel assemblies 51, 52, 53, 54, 55, 56, 57, 58, 59, 60, 61, 62, 63, 64, 65 and 66 having the first aspect ratio equal to about 3 to about 4.5 resulted in more uniform flow velocity profiles and flow angles compared to grids having higher aspect ratios.

Referring to FIGS. 2 and 3, a first flow distribution array 82 is positioned in the conduit 20 and in the hood section 18B; and a second flow distribution array 84 is positioned in the conduit 20 upstream of the inlet 24. The first flow distribution array 82 is defined by a first row 82A of twelve substantially cylindrical members, such as but not limited to tubes 86 each having a diameter D9 and a second row 82B of thirteen substantially cylindrical members, such as but not limited to tubes 86 each having a diameter D10. One of the tubes 86 is positioned in the hood section 18B. The rows 82A and 82B are spaced apart from one another by a distance W5 and are inclined at an angle S9 relative to a reference line R9. In one embodiment the diameter D9 is about 2 inches, the spacing W5 is about six inches and the angle S9 is about forty five degrees. The second flow distribution array 84 is defined by four substantially cylindrical members, such as but not limited to tubes 85 having a diameter D10. The tubes 85 are arranged in two rows 84A and 84B, with two of the tubes 85 in the row 84A being positioned above the tubes 85 in the row 84B. The tubes 86 and 85 extend between and are secured to a first side 20F and a second side 20R of the conduit 20. One of the tubes 86 is positioned between and secured to the first side 18F and the second side 18R of the hood section 18B. The first flow distribution array 82 and the second flow distribution array 84 have utility in decreasing velocity entering the flow channel assembly 51 adjacent to the inlet 24. While one of the tubes 86 is described and shown as being positioned in the hood section 18B, the present disclosure is not limited in this regard as any number of tubes may be positioned in the hood section and/or the conduit 20.

Figure 5:
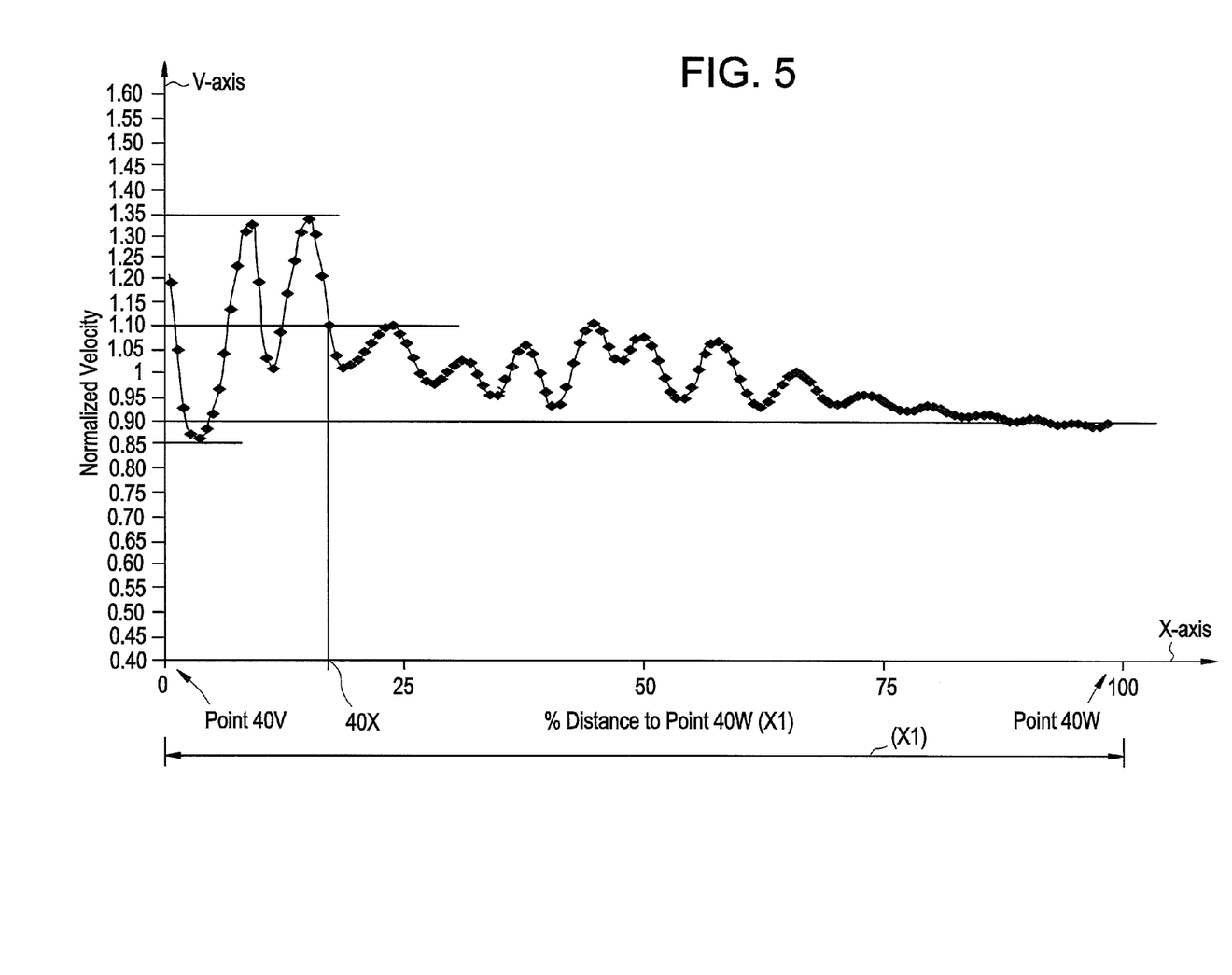
FIG. 5 is a velocity profile graph of normalized velocity of a fluid flow exiting the flow control grid as a function of a distance from an inlet to the grid.

During operation of the SCR reactor 18, flue gas flows from the exhaust section 16 and into the conduit 20 in the general direction of the arrow F1. The flue gas travels through the hood section 18B and into the flow control grid in the general direction of the arrows F3. The flow distribution arrays 82 and 84 distribute flow substantially uniformly into each of the flow channel assemblies 51, 52, 53, 54, 55, 56, 57, 58, 59, 60, 61, 62, 63, 64, 65 and 66. The direction of the flow of flue gas is changed by ninety degrees in the turning areas 78 and then flows through the flow paths 70. The flue gas exits the flow paths 70 in the general direction of the arrow F2. The flow channel assemblies 51, 52, 53, 54, 55, 56, 57, 58, 59, 60, 61, 62, 63, 64, 65 and 66 and/or the flow distribution arrays 82 and 84 cooperate to create a substantially uniform flow velocity profile downstream of the flow channel assemblies from a point 40V to another point 40W for admission to the catalyst grids 36. The uniform flow velocity profile is described herein in terms of normalized velocity of the flue gas exiting each of the flow paths 70. The normalized velocity is defined herein as a velocity at a particular point divided by the average of velocities of fluid flow at a plurality of points between the point 40V and the point 40W. For example, as shown FIG. 5 the normalized velocity of the flue gas exiting the flow paths 70 proximate the outlet plane 80 is shown on a V-axis and percentage of distance from point 40V to the point 40W is shown on the X-axis. In one embodiment, the normalized velocity of the flue gas exiting the flow paths 70 proximate the outlet plane 80 is between about 0.85 and 1.35. In particular, from the point 40V to a point 40X located a distance of about 17% of the distance X1 from the point 40V to the point 40W the normalized velocity of the flue gas exiting the flow paths 70 proximate the outlet plane 80 is between about 0.85 and 1.35; and from the point 40X to the point 40W the normalized velocity of the flue gas exiting the flow paths 70 proximate the outlet plane 80 is between about 0.85 and about 1.1 or about 0.90 and about 1.1.

Figure 6:
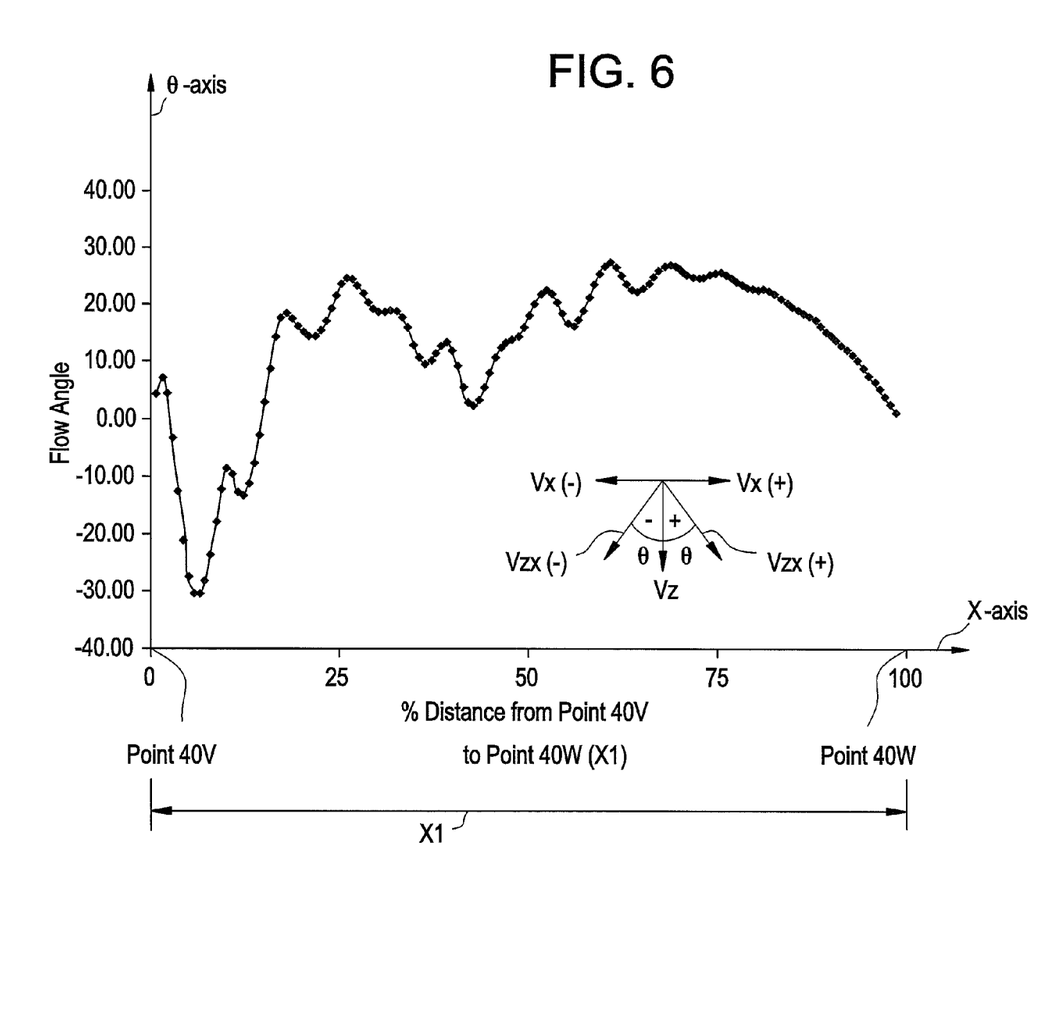
FIG. 6 is a graph of the approach angle of a fluid exiting the flow control grid as a function of a distance from an inlet to the grid.

Referring to FIGS. 2, 4 and 6, in one embodiment, the direction of the flow of the flue gas exiting the flow paths 70 proximate the outlet plane 80 is at an angle θ relative to the Z-axis. The angle θ is negative for fluid vectors having a negative X component Vx(−) and Vz component. The angle θ is positive for fluid vectors having a positive X component Vx(+) and Vz component. FIG. 6 is a graph the angle θ shown on the θ-axis and percentage of distance from point 40V to the point 40W is shown on the X-axis. In one embodiment, the angle θ of the flue gas exiting the flow paths 70 proximate the outlet plane 80 with a majority of points within +/− (plus or minus) fifteen degrees of a reference line (Vz) Z-axis (e.g. vertical).

The flow control grid is operable to affect a substantially uniform velocity profile at an outlet thereof. In one embodiment, the substantially uniform velocity profile is defined by a maximum deviation of normalized velocity having a majority of values between about 0.85 and 1.1. In one embodiment, the uniform velocity profile at the outlet 40B is defined by angular velocity vectors having a direction within a range of about +/− fifteen degrees from the reference line Vz. The flow control grid has utility in Selective Catalytic Reduction (SCR) reactors for use in furnaces which discharge ash containing flue gas such as coal and, to a lesser extent, oil burning furnaces. In such SCRs the uniform angular velocity profile created by the flow control grid improves efficiency of the SCR and reduces erosion caused by high localized flow velocities. The advantage of this invention is the reduction of the SCR reactor height resulting in less construction material and support steel with substantial savings in material and labor costs.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A flow control system for changing the direction of a fluid flow and developing a uniform flow velocity within a conduit, the flow control system comprising:
a flow distribution array comprising a plurality of tubes extending across a width of the conduit and secured between first and second sides of the conduit;
a plurality of channel assemblies disposed adjacent to one another and arranged in a stepped configuration; each channel assembly for receiving a portion of the fluid flow including:
a flow straightening section including a plurality of flow plates positioned substantially parallel to one another and spaced apart from one another to define a plurality of flow paths between the spaced flow plates;
a flow turning section disposed upstream of the flow straightening section, the flow turning section including a turning vane for directing a respective portion of the fluid flow substantially to the plurality of flow paths defined by the flow plates of the respective flow straightening section, the turning vane having an arcuate segment that extends outwardly and upstream from the flow straightening section: and the flow distribution array disposed upstream of the channel assemblies.

2. The flow control system of claim 1 wherein the flow straightening section has a first height and the flow plates are spaced apart from one another by a first width, and the first height divided by the first width defines an aspect ratio, the aspect ratio having a magnitude of about 3 to about 4.5.

3. The flow control system of claim 1 wherein the flow turning section defines a second substantially flat section extending upstream from the arcuate segment.

4. The flow control system of claim 1 wherein the turning vane is curved to change the direction of a fluid flowing therethrough by about ninety degrees.

5. The flow control system of claim 1 wherein the plurality of the tubes of the flow distribution array comprise at least one cylindrical member extending across the conduit.

6. The flow control system of claim 1 wherein the flow straightening section has a first height and the flow plates are spaced apart from one another by a first width, and the first height divided by the first width defines a first ratio, the first ratio having a magnitude of about 3 to about 4.5.

7. The flow control system of claim 1 being disposed in a selective catalytic reduction reactor.

8. The flow control system of claim 1 wherein the flow straightening section has a first height and the flow plates are spaced apart from one another by a first width, and the first height divided by the first width defines an aspect ratio, the aspect ratio having a magnitude of about 2 to about 9.

9. The flow control system of claim 1, further characterized in that an inlet duct is in fluid communication with a hood section; and
the plurality of channel assemblies extending across the hood section in a stepped configuration.

10. The flow control system of claims 1 wherein the turning vane includes a first substantially flat segment being disposed downstream of the arcuate segment and in the flow straightening section to define a flow path in the flow straightening section.

11. The flow control system of claim 1, wherein the flow plates are disposed vertically.

12. The flow control system of claim 1 wherein the plurality of tubes of the flow distribution array comprises a plurality of tubes extending across the conduit in an incline formation.

13. The flow control system of claim 1 further comprising first and second flow distribution arrays, the second flow distribution array having a plurality of spaced members disposed downstream of the first flow distribution array.

* * * * *